Aug. 7, 1956
G. NATTA
2,757,754
CONTINUOUS PROCESS FOR SEPARATING TWO GASES
HAVING BOILING TEMPERATURES WHICH
CLOSELY APPROACH ONE ANOTHER
Filed May 8, 1953
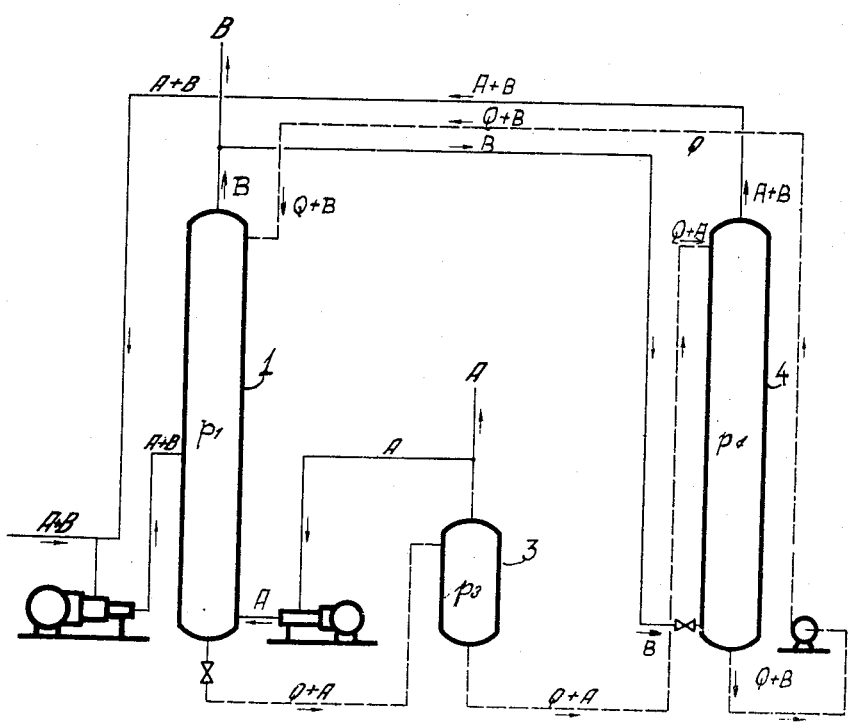
INVENTOR.
Giulio Natta.
BY
Knight Bros.

United States Patent Office 2,757,754
Patented Aug. 7, 1956

2,757,754

CONTINUOUS PROCESS FOR SEPARATING TWO GASES HAVING BOILING TEMPERATURES WHICH CLOSELY APPROACH ONE ANOTHER

Giulio Natta, Milan, Italy, assignor to Montecatini, societa generale per l'Industria Mineraria e Chimica, a corporation of Italy Application May 8, 1953, Serial No. 353,714

Claims priority, application Italy May 21, 1952

11 Claims. (Cl. 183—115)

This invention relates to a method of separating two gases having boiling temperatures which closely approach each other.

It is known that the separation of two gases having close boiling temperatures is practically impossible or too expensive, when using the normal processes of distillation and rectification. It has been suggested that such separations can be facilitated by employing fractional absorption processes or extractive distillation, in conjunction with a selective solvent. Such processes have been discussed by this patentee in Ullmanns Encyklopädie der Technischen Chemie, 1951, vol. 1, page 407; in Chimica e Industria, 24, 43 (1942); and by this patentee and G. F. Mattei in Chimica e Industria, 24, 271 (1942).

However, these processes turn out to be very expensive, if practiced on an industrial scale, particularly if the solubility of the gases in the solvent employed is very low and it is for this reason that the separation, for example, of butadiene from butylene by means of solvents having a higher boiling temperature than that of furfural, has found no commercial application.

Whenever the solubility of the gases in a given solvent is very low, large quantities of the solvent are required and the cost of an operation resulting in complete degasification of the solvent by heating becomes uneconomical. On the other hand, if the solvent is returned into the cycle without complete degassing, the yields attained in the separation process decrease considerably.

Now it has been found that a relatively inexpensive continuous separation with practically complete recovery of the components at high concentration may be obtained in certain cases by stripping the solvent solution after degassing with the less soluble component of the two gases.

It is surprising that such a process should solve certain fractionating problems because at first sight it appears incredible to recombine a solvent with the previously separated less soluble gas and to purposely recycle with the solvent the less soluble gas, to bring it in contact with new gaseous mixture.

However, in many cases such a process proves to be surprisingly advantageous, particularly in cases where it would be necessary to heat the solvent to a high temperature or to subject it to a high vacuum for complete degassing and regenerating.

Furthermore, the process according to the present invention permits to operate at economically low pressures and with low gas concentrations in the solvent solution; thus under conditions at which the selectivity of the solvent is highest.

The apparatus and operative steps of the herein disclosed cyclic process consist essentially of a fractionating column 1 with an inlet at the middle zone for the mixture of gases ($A+B$) which are to be separated. If required, the gaseous mixture may be entered under pressure. Together with the fresh gas mixture another gas mixture ($A+B$) which is recycled from a stripping column 4 is fed to column 1. The last-named gas mixture is generally of a different percentage composition than that of the fresh gases.

The solvent Q, coming from the stripper 4, is fed near the top of column 1, stripped of the gaseous component A but retaining the gaseous component B. Discharged at the top is the less soluble gaseous component B, a portion of which is passed to the stripping column 4 while the remainder is removed as separated product B. This last-named portion is practically equal to the quantity of gas B contained in the fresh gases ($A+B$) entering column 1.

Recycled gas A, coming from the degasifier 3, enters, after previous compression, near the bottom of the fractionating column 1, and solvent enriched by the more soluble gaseous component ($Q+A$) is taken off at the bottom of the column.

The fractionating apparatus may consist of one of the usual plate rectifying columns (preferably with about ten plates) or of a column packed, for example, with Raschig rings. Generally, the rectifying column should be relatively high.

The solution ($Q+A$) coming from column 1 is expended in the degasifier 3 from a pressure $p_1$ to a pressure $p_3$, to liberate a considerable portion of dissolved gas A. Such degasification is aided by heating, if necessary. Part of the liberated gas A is compressed and returned to column 1 as reflux. The remaining part is removed as separated and recovered product A in an amount which is practically equal to the quantity of gas A contained in the mixture of the fresh gases ($A+B$) entered into the cycle.

The solvent which comes from the degasifier and still contains a portion of gas A in solution is treated counter-currently with gas B coming from column 1.

The last-named operation is carried out in the stripper 4. This column may be of the plate-or-packed type (e. g. Raschig-column) similar to column 1.

The gas leaving the column 4 is added to the fresh gases entered into the cycle, and the solvent which has been stripped of gas A, but still contains gas B, is returned to the top of column 1.

The attached drawing is a schematic illustration of the equipment and the cyclic process. The operation may be carried out under practically isothermal conditions. Therefore, it is not necessary to have recourse to external heat in order to return the more soluble component A into the column 1, contrary to the requirements of an extractive distillation.

Of course, if waste heat or other low cost heat is available (e. g. surplus hot water from other parts of the plant), it may be convenient to heat the solvent during the degassing in order to increase the quantity of liberated gas A before completing the degasification-regeneration of the solvent Q by stripping it by means of the less soluble gas component B.

In general, the pressure $p_4$ of the stripper is the lowest of the cycle if it is not equal to the pressure $p_3$ of the degasifying apparatus 3.

In case of a substantially isothermal procedure, the bigger the difference between the pressure $p_1$ of the fractionating column 1 and the pressure $p_4$ of the stripper 4, the lower may be the selectivity of the solvent.

Let $\alpha$ be the coefficient of solubility of the more soluble gaseous component A, and $\beta$ that of the less soluble component B, such solubilities being expressed in terms of volume units (i. e., at 0° C. and 760 mm. Hg) of gas which can be dissolved at a pressure of one atmosphere absolute in a given volume unit of the solvent at the operating temperature, and let $\gamma$ be equal to the ratio $\beta/\alpha$, then, according to my experiments, the pressure $p_1$ of the fractionating column 1 must be higher than $$p_1 > \frac{2-\gamma}{1-\gamma} p_3 \qquad (I)$$

(wherein $p_3$ is the pressure in the degasification stage), to obtain optimum separation of the gases by means of the present cyclic process. The selection of a suitable pressure $p_3$, usually equal to or slightly greater than atmospheric pressure, permits the establishment of a theoretical minimum value for $p_1$.

Generally, however, for economic reasons it is preferable to operate at pressures $p_1$ which are much higher than the minimum value derived from the foregoing Formula I.

The minimum theoretical volume for Q (regenerated solvent to be fed to column 1 per time unit) depends upon the amount of gaseous mixture $A+B$ fed per time unit to column 1.

$$Q > \frac{A+B}{p_1(\alpha-\beta) - p_3(2\alpha-\beta)} \qquad (II)$$

wherein A and B are the volume units of the more soluble and the less soluble gas, respectively, in the initial mixture introduced into the cycle per time unit, $p_1$ and $p_3$ are the pressures in the fractionating and degasifying columns, respectively, and $\alpha$ and $\beta$ are the solubility coefficients (at the temperature of the fractionating stage) of the more soluble and the less soluble gaseous components.

Generally, in order to obtain good results, it is desirable to operate with quantities of solvent which are somewhat larger than those indicated by Formula II.

The quantity of reflux gas A to re-enter at the bottom of column 1 is preferably such so as to obtain a solvent effluent from the fractionating column which is practically saturated with component A.

The amount of this gaseous reflux is the difference between the amount of gas A liberated during degasification at the pressure $p_3$ in the degasifying apparatus 3 and the amount of gas discharged from the cycle after leaving the degasifier.

The amount discharged is normally about equal to the amount of the more soluble component A contained in the initial mixture $A+B$.

If the degassing step is supported by heat, the procedure is equivalent to operating the degasifier at a lower pressure $p_3$. As a result, the fractionating column 1 may be operated at a pressure $p_1$ which is correspondingly lower than that required for an operation under isothermal conditions. Heating of the degasifier changes the limitations set forth in Formula I for the ratio between the operation pressures $p_1$ and $p_3$.

The Formulae I and II, which refer to isothermal conditions, may be suitably changed by substituting for pressure $p_3$ a pressure $p_{1c}$ derived as follows:

$$p_{1c} \geq \frac{2-\gamma}{1-\gamma} \cdot \frac{\alpha t_3}{\alpha t_1} \cdot p_3 \qquad (III)$$

wherein $\alpha t_3$ is the solubility of the gas A at a temperature $t_3$ (the actual temperature in the degasifier), $\alpha t_1$ is the solubility of the same gas, at the same pressure but at the temperature $t_1$ of the fractionating column 1, $p_3$ is the pressure in the degasification stage and $\gamma$ is the ratio $\beta/\alpha$ of the solubility coefficients (at the temperature of the fractionating stage) $\alpha$ and $\beta$ of the more soluble and less soluble gaseous components, respectively, expressed in volume units of these components at a pressure of one atmosphere absolute in one volume unit of the solvent.

Where the degasification of the solvent leaving the fractionating column 1 is effected by heating, the volume of the regenerated solvent $Q_1$ which is to be fed at a time unit into the fractionating column is determined by means of the following relation:

$$Q_1 > \frac{(A+B)}{p_1(\alpha-\beta) - p_3 \frac{\alpha t_3}{\alpha t_1}(2\alpha-\beta)} \qquad (IV)$$

wherein A and B are the volumes of the more soluble and less soluble gas, respectively, in the initial mixture introduced into the cycle per time unit, $p_1$ is the pressure at the fractionating stage, and $p_3$, $\alpha$, $\alpha t_3$, $\alpha t_1$ and $\beta$ are as defined in connection with Formula III.

Where solvents are employed which have a low solvent capacity for the gases under consideration, it is necessary to use large quantities of solvent. In such a case, the consumption of energy for compressing the solvent from the pressure of the stripping column 4 to that of the fractionating column 1 can be reduced by utilizing the energy set free in the expansion of the solution from the pressure $p_1$ of the fractionating column to the pressure $p_3$ of degasification.

For example, the herein-described process lends itself particularly to the separation of butadiene from 1-butylene, if as the selective solvent an unsaturated hydrocarbon is employed which has a high boiling temperature, such as, for instance, tetraline or anthracene oil, which dissolve more butadiene than butylene.

The present invention is also suitable for the separation of 2-butene from n-butane by using high boiling solvents, preferably oxygenated ketonic compounds, or esters, polyesters or substituted amides which dissolve more of the butylene than of the 2-butene. Similarly, the process is applicable for many other binary separations of the aforementioned type.

*Example*

For the purpose of illustrating, but without limiting the present invention, the separation of a gaseous mixture of 100 volume units consisting of 70% by volume butylene (B) and 30% of butadiene (A) is described. The gaseous mixture coming from stripper 4 consists of 18 volumes of the gas B and about an equal amount of the gas A. Employing anthracene oil as the solvent and fractionating at 28° C. and about 2 atm. pressure, the recovered gases are free from solvent vapors because the solvent is not very volatile. However, it is also not very selective ($\gamma$=about 0.5).

Slightly more than 2 volume units of solvent are needed for every 100 volume units of gas mixture.

The amount of reflux gas is slightly less than 2.5 times the volume of the mixture of fresh gases entering into column 1. The degasifier is operated at atmospheric pressure while heating to 75° to 80° C.

The production of butadiene (A) separated from the cycle by means of the degasifier corresponds to about 30 volume units. The purity of the separated product is better than 96% to 98%. Considerably higher purities are obtained if tetraline or dimethylformamide is employed as solvent instead of anthracene oil. The solvent leaving the degasifier contains 8 to 9 volume units of dissolved butadiene per volume unit of solvent and is stripped at atmospheric pressure in countercurrent with butylene.

In the above case, there are employed about 18 volume units of 80% butylene for every 100 volume units of the fresh gas mixture.

The solubility coefficients in anthracene oil at 28° C. are:

$\alpha$=51 for butadiene (A)
$\beta$=25 for butylene (B).

I claim as my invention:

1. A continuous process for separating a gaseous mixture of two materials having substantially close boiling points, comprising intimately contacting in a fractionating column the gaseous mixture with a solvent which is selective with respect to said two materials, recovering as a first separation product one portion of that of said two materials which is less soluble in said selective solvent and is discharged at the top of said fractionating column, subjecting the solvent effluent from said fractionating column containing substantially all of the material which is more soluble in said solvent to a degassing process, recovering as a second separation product a portion of the gaseous release of said degassing process, recycling a second portion of said gaseous release to the bottom of said fractionating column, entering the solvent solution which, after said degassing, contains a residual portion of said material which is more soluble in said solvent near the top of a stripping column, passing it, within said stripping column, in countercurrent flow with a second portion of that of said two materials which is less soluble in said selective solvent and is discharged at the top of said fractionating column, recycling the effluent of said stripping column to the top of said fractionating column, and recycling the gaseous mixture of said two materials which is discharged at the top of said stripping column in contact with untreated mixture of said two gaseous materials which is about to enter said fractionating column.

2. The process according to claim 1, being carried out at a substantially uniform temperature throughout the fractionating stage, the degasifying stage, and the stripping stage.

3. The process according to claim 1, wherein the pressure $p_1$ within the fractionating column is determined by the relation $$p_1 > \frac{2-\gamma}{1-\gamma} \cdot p_3$$

wherein $p_3$ is the pressure applied at the degasification stage and $\gamma$ is the ratio $\beta/\alpha$, $\alpha$ being the solubility coefficient of the more soluble gaseous component and $\beta$ the solubility coefficient of the less soluble gaseous component, said solubility coefficients expressing the number of volumes of gas at 0° C. and 760 mm. Hg which, at the fractionating temperature and at a pressure of one atm. absolute, dissolve in one volume unit of the solvent.

4. The process according to claim 1, wherein the volume Q of regenerated solvent to be recycled to the fractionating column per time unit is determined by the relation $$Q > \frac{A+B}{p_1(\alpha-\beta) - p_3(2\alpha-\beta)}$$

wherein A and B represent the volumes of the more soluble and less soluble gaseous component, respectively, introduced into the fractionating column within a time unit, $p_1$ and $p_3$ are the pressures applied at the fractionating stage and degasifying stage, respectively, and $\alpha$ and $\beta$ are the solubility coefficients of the more soluble gaseous component and the less soluble gaseous component, respectively, said solubility coefficients expressing the number of volumes of gas at 0° C. and 760 mm. Hg which, at the fractionating temperature and at a pressure of one atm. absolute, dissolve in one volume unit of the solvent.

5. The process according to claim 1, in which the degassing of the solvent solution leaving the fractionating column is carried out by means of heating.

6. The process according to claim 5, wherein the pressure of the fractionating column is determined by the relation $$p_{1e} \geq \frac{2-\gamma}{1-\gamma} \cdot \frac{\alpha t_3}{\alpha t_1} \cdot p_3$$

wherein $p_3$ is the pressure applied at the degasification stage, $\alpha t_3$ and $\alpha t_1$ are the solubility coefficients of the more soluble gaseous component at the degasification temperature $t_3$ and at the fractionating temperature $t_1$, respectively, and $\gamma$ is the ratio $\beta/\alpha$, $\alpha$ being the solubility coefficient of the more soluble gaseous component and $\beta$ the solubility coefficient of the less soluble gaseous component, said solubility coefficients expressing the number of volumes of gas at 0° C. and 760 mm. Hg which, at the fractionating temperature and at a pressure of one atm. absolute, dissolve in one volume unit of the solvent.

7. The process according to claim 6, wherein the volume Q of regenerated solvent to be recycled to the fractionating column per time unit is determined by the relation $$Q_1 > \frac{(A+B)}{p_1(\alpha-\beta) - p_3 \frac{\alpha t_3}{\alpha t_1}(2\alpha-\beta)}$$

wherein A and B represent the volumes of the more soluble and less soluble gaseous component, respectively, introduced into the fractionating column within a time unit, $p_1$ and $p_3$ are the pressures applied at the fractionating stage and degasifying stage, respectively, $\alpha$ being the solubility coefficient of the more soluble gaseous component and $\beta$ the solubility coefficient of the less soluble gaseous component, said solubility coefficients expressing the number of volumes of gas at 0° C. and 760 mm. Hg which, at the fractionating temperature and at a pressure of one atm. absolute, dissolve in one volume unit of the solvent, and $\alpha t_3$ and $\alpha t_1$ are the solubility coefficients of the more soluble gaseous component at the degasification temperature $t_3$ and at the fractionating temperature $t_1$, respectively.

8. The process according to claim 1, wherein a selective solvent of relatively low solvent capacity for one of the gaseous components is used which has a substantially low vapor pressure at the operating temperature.

9. The process according to claim 1, applied to the separation of a mixture of butadiene and butylene, wherein dimethylformamide is used as the selective solvent.

10. The process according to claim 9, wherein tetraline is used as the selective solvent.

11. The process according to claim 9, wherein anthracene oil is used as the selective solvent.

References Cited in the file of this patent

UNITED STATES PATENTS

| | | |
|---|---|---|
| 2,522,059 | Ray et al. | Sept. 12, 1950 |
| 2,540,905 | Neubauer et al. | Feb. 6, 1951 |
| 2,587,689 | Box | Mar. 4, 1952 |